United States Patent
Novales Gomez et al.

(10) Patent No.: US 12,362,945 B1
(45) Date of Patent: Jul. 15, 2025

(54) TECHNIQUES FOR LIMITING MANIPULATION OF URLS

(71) Applicant: Amazon Technologies, Inc., Seattle, WA (US)

(72) Inventors: Daniel Novales Gomez, Seattle, WA (US); Karthik Subbian, San Ramon, CA (US); Ishwar Ramani, Saratoga, CA (US); Gurudatta Horantur Shivaswamy, Saratoga, CA (US); Shireen Abraham, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 17/854,806

(22) Filed: Jun. 30, 2022

(51) Int. Cl.
H04L 9/32 (2006.01)
G06F 16/9538 (2019.01)
G06F 16/955 (2019.01)

(52) U.S. Cl.
CPC ........ H04L 9/3247 (2013.01); G06F 16/9538 (2019.01); G06F 16/9566 (2019.01); H04L 9/3242 (2013.01)

(58) Field of Classification Search
CPC ....... H04L 9/3247; H04L 9/3242; H04L 9/32; G06F 16/9566; G06F 16/9538; G06F 16/955
See application file for complete search history.

(56) References Cited

U.S. PATENT DOCUMENTS

| | | | | |
|---|---|---|---|---|
| 8,307,073 B1* | 11/2012 | Brundage | ........... | G06F 11/0793 709/224 |
| 2002/0107718 A1* | 8/2002 | Morrill | ................. | G06Q 30/06 705/26.41 |
| 2008/0016052 A1* | 1/2008 | Frieden | ............... | G06F 16/3331 707/999.005 |
| 2011/0213770 A1* | 9/2011 | Minogue | ............. | G06F 16/9538 707/723 |
| 2012/0036365 A1* | 2/2012 | Kyslov | ............ | H04N 21/47202 707/769 |
| 2015/0161410 A1* | 6/2015 | Andersen | ............ | G06F 16/2291 713/165 |

(Continued)

OTHER PUBLICATIONS

Brookes et al., How to Share Your Mac's Screen with Another Mac, https://www.howtogeek.com/449239/how-to-share-your-macs-screen-with-another-mac/, 2019 (Year: 2019).*

(Continued)

*Primary Examiner* — Kaveh Abrishamkar
*Assistant Examiner* — Howard H. Louie
(74) *Attorney, Agent, or Firm* — Kilpatrick Townsend & Stockton LLP

(57) ABSTRACT

Techniques are disclosed for digitally signing uniform resource locators (URLs) to prevent manipulation of search result rankings. A computer system of a service provider can receive a first request to navigate to a network page provided by the service provider and corresponding to items associated with the first request. The computer system can generate the network page by generating a URL for an additional network page linked from the network page. The computer system can use the URL to generate a signed URL that includes a digital signature. The computer system can include the signed URL in the network page and cause the network page to be presented at a user device.

20 Claims, 9 Drawing Sheets

(56) References Cited

U.S. PATENT DOCUMENTS

2017/0099301 A1* 4/2017 Zhang ................ H04L 9/3247
2021/0377020 A1* 12/2021 Kashid ................ H04L 9/083

OTHER PUBLICATIONS

Escobedo et al., Signed URLs with Laravel, https://cosme.dev/post/signed-urls-with-laravel, Apr. 2022 (Year: 2022).*

* cited by examiner

US 12,362,945 B1

TECHNIQUES FOR LIMITING MANIPULATION OF URLS

BACKGROUND

Online service providers, including retailers, frequently curate search results presented on a webpage. The results may be ordered or arranged in a way that is beneficial to a user by making pertinent or popular results appear first in a list or feature more prominently on the webpage. Searches may be refined to change how the results are displayed based on interactions with links on the page. The service providers can develop their curation by evaluating website traffic, including correlating which links/refinements produce the most efficient website interactions. However, links, and specifically the corresponding uniform resource locators (URLs), are freely editable. This allows unscrupulous actors to deliberately alter the URLs and use automated systems to send page requests to the service providers to artificially boost a ranking of search results.

BRIEF DESCRIPTION OF THE DRAWINGS

Various embodiments in accordance with the present disclosure will be described with reference to the drawings, in which.

DETAILED DESCRIPTION

Figure 1:
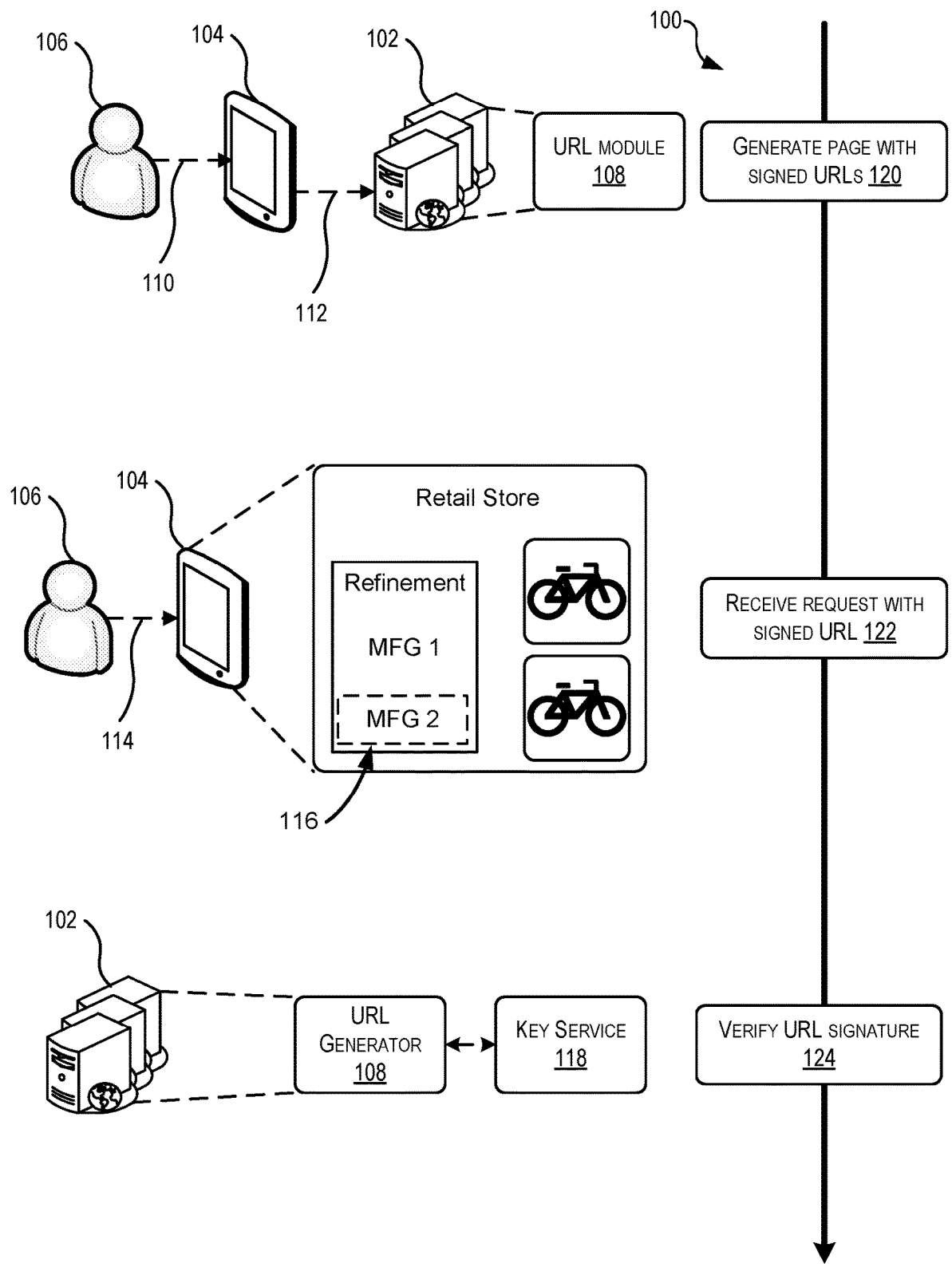
FIG. 1 is a block diagram and associated flow chart of an example process to digitally sign a URL provided as part of a web page, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Online service providers, and in particular online retailers and other e-commerce providers, have an interest in providing efficient transactions between their computer systems and the multiple user devices with which those systems interact. Requests from user devices, particularly search requests, can produce search results of immense size. The search results may be reduced with refinement sent from the user devices. However, there can still be hundreds or thousands of matching results, which cannot be reasonably presented at a user device on a single web page. This leads to challenges for the computer systems to manage both the data for the results and the amount of request traffic between the user devices and the servers to obtain and narrow the results.

One common solution is for a computer system to rank the results using various algorithms and models to predict which results are most pertinent to the search. More highly ranked results may be presented by a user device (e.g., on the first page of results) or with greater emphasis (e.g., highlighting on the page, etc.). The rankings can be based on how well the search terms match various descriptive parameters of the items (indicating pertinence). The computer system can also evaluate how user devices interact with the website to inform the ranking models. For instance, a user device may submit a particular search request, receive a page of results, and send a selection request for the third item on the page. The number of transactions (e.g., request/result traffic) between the user device and a server may be indicative of the usefulness of the rankings.

The interactions typically take the form of HTTP requests based on selections of features (e.g., links, buttons, etc.) presented on the web page, with the features having corresponding URLs for subsequent pages or resources from the website. The URLs can contain parameters to allow the server system to identify those resources. Search results may be refined by, for example, restricting the results sent to the user device by manufacturer, brand, style, color, and the like. The narrower categories of results may be selected using links, sliders, or other features presented on the web page. The interactive features can have corresponding URLs specifying how the results are to be refined. Requests having the corresponding URLs can result in the user device receiving a new web page with the refined search results.

However, web browsers and similar applications typically allow URLs to be freely modified. Query strings and other fields within a URL can be added or adjusted, and the URL sent as a request for the corresponding web page. Thus, a user device can obtain a web page for a particular refined product search by sending a specific URL, rather than entering a search term, selecting a refinement, and navigating through the service provider's website. With respect to the URL, and a system evaluating interactions based on the URL, the request replicates a user's "organic" navigation to the web page and may be used by the ranking models to affect the ranking of the items displayed on the web page. By creating and/or modifying URLs to simulate legitimate traffic, the rankings of certain items can be artificially boosted, distorting search results for the users and generating excess request traffic for the service provider computer system.

To prevent unauthorized altering of the ranking system, a method for digitally signing URLs can be implemented. Techniques described herein include methods and computer systems for generating signed URLs for a web page. The digital signature can be a cryptographic hash of the URL and/or other parameters related to a user interaction with the website. The digital signature can be appended to the URL as a URL parameter or other field to create the signed URL. In some instances, the digital signature may be included in the HTTP request (e.g., as part of the HTTP request header, the HTTP request body, etc.). The digitally signed URLs may correspond to links for refining search results within a searchable web site of a service provider. When the user device receives input for selecting a link with a signed URL, the service provider computer system can receive the signed URL and can check the signature to verify that the interaction legitimate traffic. In doing so, the service provider can distinguish requests generated by legitimate interactions (the "organic" user behavior) from requests generated by modified URLs ("inorganic" user behavior from link spoofing, click farms, etc.).

To sign the URLs, the service provider computer system can generate a cryptographic hash from a given URL. The cryptographic hash can be implemented by a hashing algorithm that uses a key provided by a key service of the computer system. The key can be stored by the computer system. The cryptographic hash can be generated using the URL and one or more additional identifiers associated with the user, a user device, the user's session with the service provider, or divisions of the service provider's website, including session identifiers, query identifiers, market identifiers, or the like. The identifiers may be strings or other similar data for uniquely identifying some aspect of the user session. For example, a session identifier may be an HTTP cookie that is generated by the service provider and stored by a user device to identify that user device during a unique session with the service provider.

Upon receiving a request with a signed URL, the computer system can verify the digital signature by retrieving the stored key and computing another hash using the URL. If the request is sent from the user device that made the initial search and received the web page with the signed URLs, the computer system can generate a matching hash and thus verifying the request as arising out of "organic" user behavior. If the request has a modified URL, the computer system will generate a different hash. The mismatch can indicate that the URL has been tampered with or is otherwise untrustworthy. Similarly, if the request is sent from a different user device, then the corresponding session identifier will be different, resulting in a different generated hash and a mismatch with the digital signature.

As a particular example of the above, consider an online retailer offering a selection of items for purchase via the retailer's website. A user may search for "shoes" on the website using a user device and receive a web page with search results for many different brands, styles, sizes, and other categories of shoes. Based on a ranking, the web page may have certain brands or styles of shoes displayed at the top (or highlighted or featured more prominently), including popular brands or styles that are typically selected by similar users searching for shoes. The web page can also present links to refine the search results. For example, the user may be able to select a refinement for "women's shoes." The URLs for the refinement may be signed URLs and include a digital signature. Upon selecting the refinement link, another web page can be presented at the user device with a subset of women's shoes available from the retailer. This second web page can also present certain shoes at the top according to a ranking. The user can browse and select a specific shoe that interests them or select further refinement links and view additional web pages. Because the retailer's computer system is receiving the requests from interactions with signed URLs from the user device, the digital signatures will be verified.

Interaction information for the transactions between the user device and the computer system may be used as inputs into the model that generated the ranking. For instance, the user device can send a request for a selection a particular brand and style of women's shoe from the refined search results web page. The computer system can use that information as an indication of popularity of that brand and style, which can be an input into a ranking model. The ranking model can then produce updated rankings where that brand and style of shoe may be more highly ranked and therefore appear nearer to the top of the web pages. Requests with digitally signed URLs that are verified may be logged as trusted according to a policy for using information from the requests as part of the ranking model. Requests with digitally signed URLs that are not verified may be logged as untrusted. The information from untrusted requests may be omitted from input into the ranking models. In some cases, information from untrusted requests may be used in the ranking models in a different manner than trusted request information, for example by assigning untrusted requests a lower weight in a model.

The techniques described herein can provide several advantages. By providing a way to distinguish between "organic" requests and "inorganic" requests, a service provider may be able to limit unauthorized modification of search rankings. Large, unauthorized groups of devices, e.g., "click farms," may submit voluminous requests with modified URLs, which can result in a boost in the rankings of search results. Digitally signed URLs can prevent against unauthorized redirecting of user device traffic, since the computer system can verify which requests have been modified. Network security can be improved, since, in some cases, tampered URLs can be used as part of URL injection attacks against legitimate websites. Digitally signed URLs can allow a server to not parse or otherwise serve or respond to a tampered URL. Such security improvements are advantageous beyond the specific case of web pages presenting search results.

As a further example of advantages provided by these techniques, improving the quality of input data into the models can improve the computational efficiency to generate rankings from the models, since the number of computing iterations to arrive at an acceptable output is reduced. Moreover, untrusted request information may not be subject to analysis and preprocessing for input into models, and may not need to be stored by the service provider for as long as the trusted request information, further reducing computational overhead. As the incentive to artificially inflate search result rankings is reduced, the spurious requests from click farms and other automated systems may also be reduced, resulting in less spurious traffic for the computer systems to manage. Additionally, high quality search rankings can result in fewer transactions, fewer page loads, and fewer refinement requests, which can lead to reduced network traffic between the service provider's computer system and the user device.

Turning now to the figures, FIG. 1 is a block diagram and associated flow chart of an example process 100 to digitally sign a URL provided as part of a web page, according to some embodiments. The diagram shows elements of a computing system corresponding to the blocks of the process 100. The process con be performed by a computer system, which can include a server device 102 and user device 104. Additional details about different computing systems that are capable of performing the techniques of the disclosure are provided below with respect to FIG. 7. In some embodiments, the server device 102 can implement a URL module 108, which can be a collection of software applications, services, and/or other processes configured to generate URLs and digitally signed URLs. The URL module 108 may be a component of a larger system for generating web pages, receiving requests, and managing interactions of a user with a website of a service provider. The service provider may be an online retailer or similar e-commerce provider or merchant. However, the techniques of this disclosure are not limited to the exemplary case of a retail website. One skilled in the art would recognize applications of these techniques to search engines, question-and-answer websites, social media platforms, and other similar service providers where search results may be ranked according to user interactions.

The process 100 may begin at block 120 with the server device receiving a request 112 for a web page. The request 112 may be received from user device 104. The request 112 may be initiated by user input 110 from user 106. For example, the user 106 may enter a search term into a search field of a web site of the service provider. The user input 110 may be received at a graphical user interface (GUI) of the user device 104, which may be presented as part of a web browser or similar application executing on the user device 104. For example, the user 106 may be interacting with a store application of an online retailer, where the store application provides search features and presents results, including network pages (e.g., web pages), similarly to a web browser.

The user 106 may have an account (e.g., a user account, a customer account, etc.) with the service provider. The user's 106 interaction with the service provider may then be part of a session associated with the account. As part of the session, the user device 104 may store a session identifier provided by the server device 102. For example, the user 106 may purchase items from an online retailer. The activity to select and purchase the items may be part of a session with the service provider. In some cases, a session can span multiple distinct interactions with the service provider. For example, the user 106 could log into a customer account and interact with the retail website on different days, with each interaction part of one session and associated with the same session identifier.

Upon receiving the request 112, the server device 102 can respond by generating a corresponding web page. The web page can include various network page resources, including interactive elements (e.g., links, selectable buttons, sliders, etc.) for adjusting, modifying, and/or refining the search results, each corresponding to a signed URL. For example, the user input 110 could be a search for "bicycles" on a retailer's website, which can return a page displaying some bicycles and refinement links to narrow the search by manufacturer, style, or color. The signed URLs may be generated by URL module 108. The URL can include one or more parameters associated with the refinement and usable by the computer system to generate a web page with the refined search results. Generating the URL can include generating a digital signature. The URL module 108 can obtain a key (e.g., an arbitrary 256 bit value) and use the key as part of a cryptographic hashing algorithm to generate a cryptographic hash. The cryptographic hashing algorithm can take the URL and one or more identifiers (e.g., session identifier, market identifier, etc.) as inputs and generate a fixed-length value as the cryptographic hash. As one example, the cryptographic hashing function may be an implementation of secure hashing algorithm (SHA) in a keyed hash message authentication code (HMAC). Such a cryptographic hashing algorithm allows for computationally inexpensive (e.g., low overhead) generation of cryptographic hashes for several URLs of a web page.

The digital signature can be included as a parameter in the URL to create a signed URL. For example, the digital signature may be a hash value included as a parameter of the signed URL. Once the page is generated, the server device 102 can send the web page to user device 104 for display.

At block 122, the server device 102 can receive a request that includes a signed URL. The request may be sent from user device 104 and correspond to user input 114 from user 106 selecting one of the refinement links, for instance a selection of the refinement link 116. As depicted in FIG. 1, the refinement link 116 may correspond to a selection of a particular manufacturer (e.g., Manufacturer 2).

At block 124, in response to receiving the request, the server device 102 can verify the digital signature of the signed URL. The URL module 108 can obtain the key used to generate the digital signature and use the key to compute a cryptographic hash from a part of the signed URL (e.g., the portion of the URL excluding the digital signature) and the one or more identifiers. The key may be obtained from a key service 118 of the computer system. The key may also be obtained from a cache. If the newly computed cryptographic hash matches the digital signature, the request with the signed URL may be "trusted" as a legitimate, organic user interaction rather than a modified URL that originated from a source other than the user 106 interacting with the signed URL via user input 114. The computer system can log whether the request is trusted or tampered, so that a downstream ranking service can use the information from the request appropriately when applying a ranking model.

Figure 2:
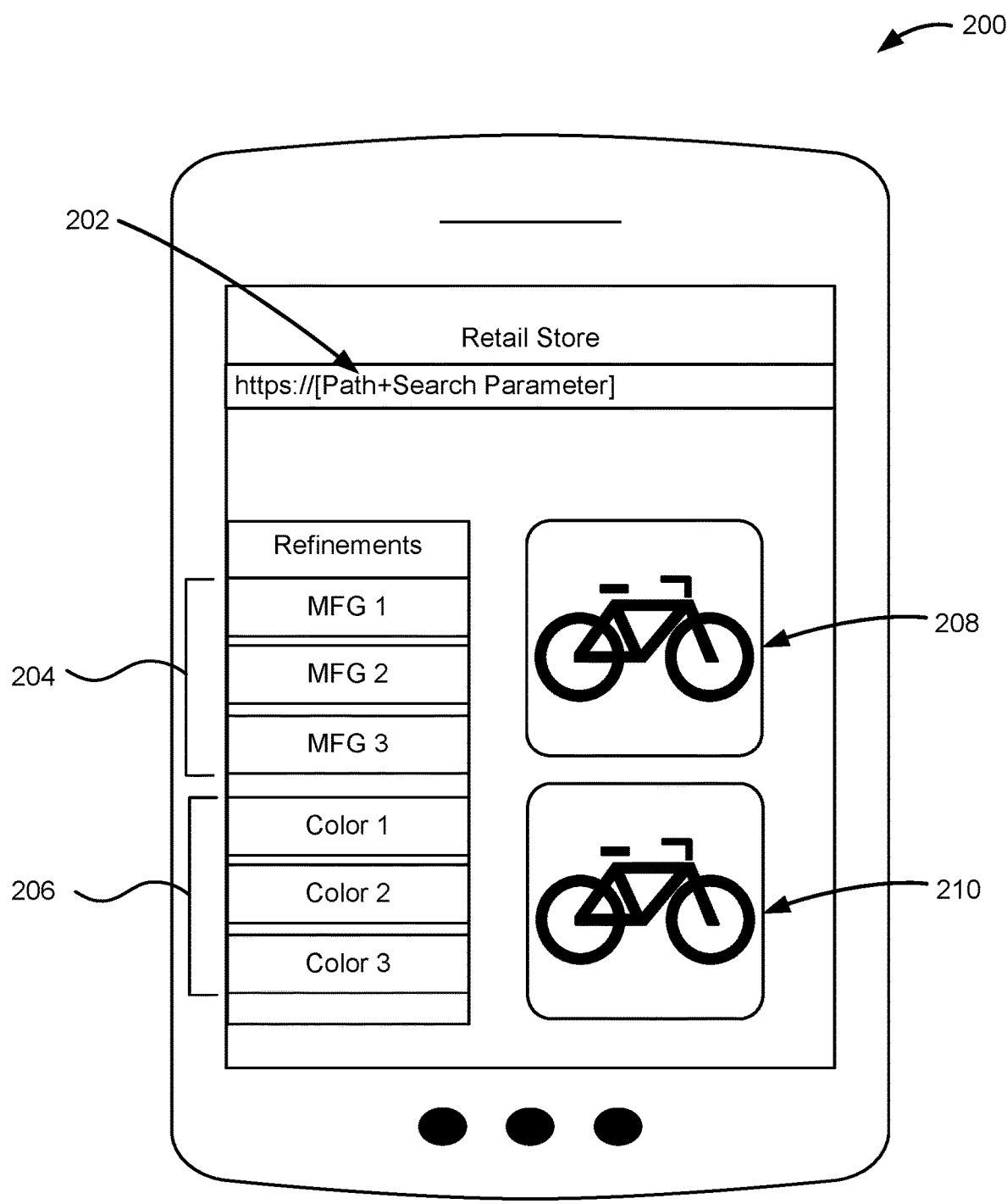
FIG. 2 is a diagram illustrating a user device displaying a web page showing search results and associated links corresponding to digitally signed URLs, according to some embodiments.

FIG. 2 is a diagram illustrating a user device 200 displaying a web page showing search results and associated links 204, 206 corresponding to digitally signed URLs, according to some embodiments. As described herein, user device 200 may be an example of user device 104 of FIG. 1. The web page displayed by user device 200 may be sent from a server device (e.g., server device 102 of FIG. 1) in response to a search request.

The web page may correspond to a URL 202 representing parameters for the search. For example, the URL 202 can include a Path value (e.g., "www.[store].com" for a generic website) and a Search Parameter (e.g., "s?-bicycles") for some search, which could be a string for the search term. The Search Parameter can be used by the computer system of the service provider serving the web page to locate the resources and send the web page to the user device 200 for display.

The web page can display several items as the search results, a first item 208 and a second item 210. As exemplified in FIG. 2, the search may correspond to a search for "Bicycles" on a retail web site, with the search returning a web page displaying two graphical elements for a first bicycle and a second bicycle. The graphical element for the first item 208 may correspond to a URL for a page describing the first bicycle in detail. Similarly, the graphical element for the second item 210 may correspond to a URL for a detail page of the second bicycle. The first item 208 may be positioned near the top of the page according to a ranking determined for the search results. If the user were to click through to the detail pages, the computer system of the service provider may use that interaction as input data for a ranking model used to generate the ranking for the search results. For example, the first item 208 may be a popular brand of bicycle, such that many users searching for "Bicycles" indicate an interest in the first bicycle by clicking through to the detail page. Because of this popularity, the first item 208 may have a higher ranking than the second item 210. In addition to position on the page, in some embodiments, the rankings may result in highlighting of the item on the web page (e.g., with highlighted border or similar graphical effect) or placement on the first page of results (e.g., when results are sorted by multiple pages).

The web page can include links for refining the search results. The refinements can include narrowing the search results with additional refinement parameters. For example, the search for "Bicycles" may be refined by selecting a particular manufacturer with links 204 and/or a particular color with links 206. The number and category of refinements may depend on the type of item and the variety of that item available from the service provider. Each of the links 204, 206 may have a corresponding signed URL. The signed URL can include the associated refinement parameter as well as the digital signature generated for the URL. A selection of one of the links 204, 206 may cause the user device to send a request to the service provider for the web page corresponding the signed URL of the selected link.

Figure 3:
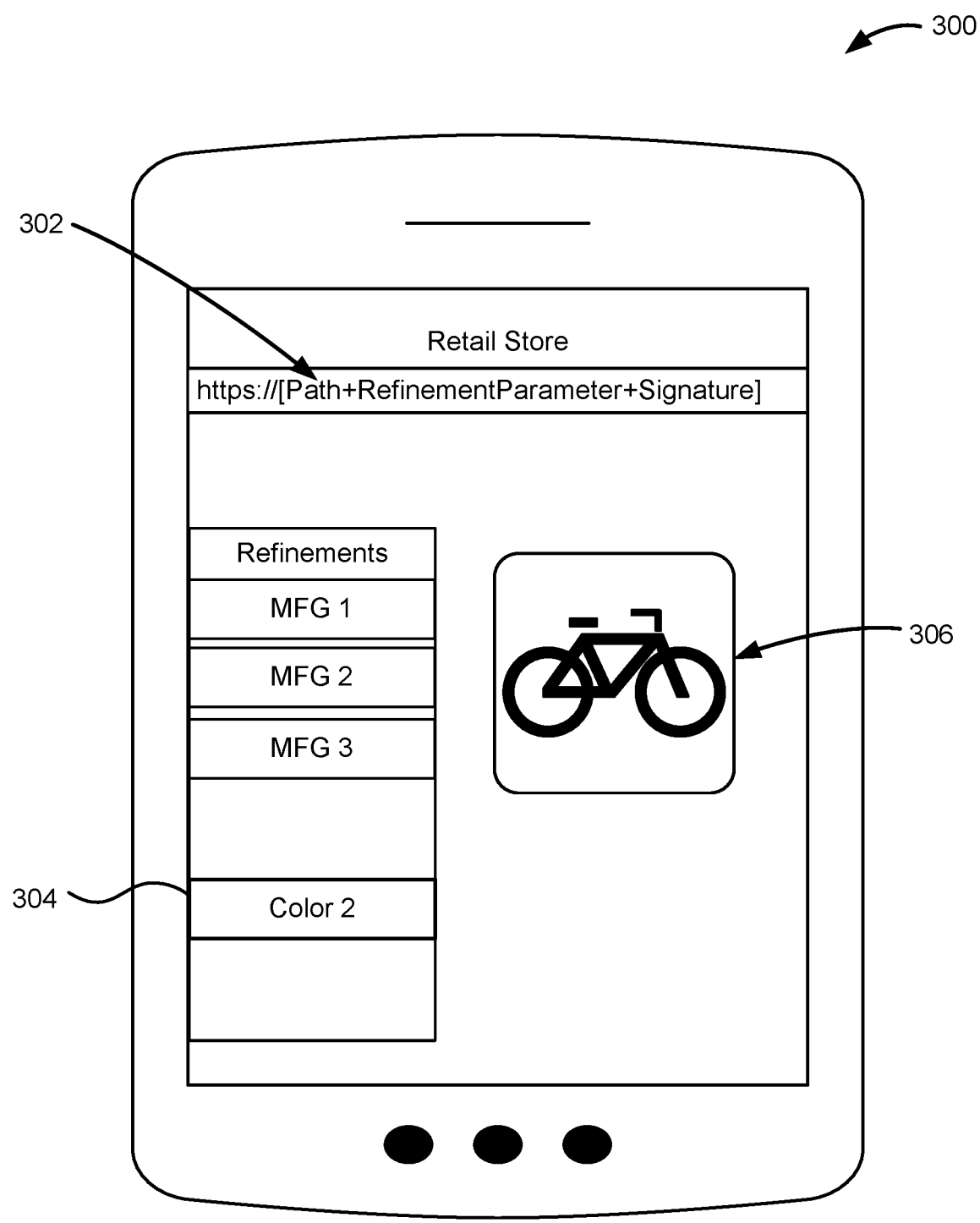
FIG. 3 is a diagram illustrating a user device displaying a web page showing refined search results after a corresponding digitally signed URL was selected, according to some embodiments

FIG. 3 is a diagram illustrating a user device 300 displaying a web page showing refined search results after a corresponding digitally signed URL 302 was selected, according to some embodiments. The user device 300 may be similar to user device 200 of FIG. 2. The refinement may be to the search described above in FIG. 3, exemplified as "Bicycles" from a retail website. As depicted in FIG. 3, the refinement link 304 corresponding to "Color 2" has been selected.

Based on the refinement, the web page displayed by user device 300 may be generated by the service provider using the signed URL 302. The signed URL 302 can include the Path and Refinement Parameter (e.g., "r-Color2" as a query field in the URL). The signed URL 302 can also include the digital signature as a query field in the URL.

The second web page with the refined search results can include item 306, which can be an item from that corresponds to both the search term and the refinement parameter. For example, for the search term "Bicycle" and the refinement parameter "Color 2," the item 306 can be a bicycle having the color of Color 2 (e.g., red). As with the first item 208 and the second item 210 of FIG. 2, the item 306 may be displayed near the top of the refined search results according to a ranking, which may be the same ranking used to arrange the first item 208 and the second item 210.

Figure 4:
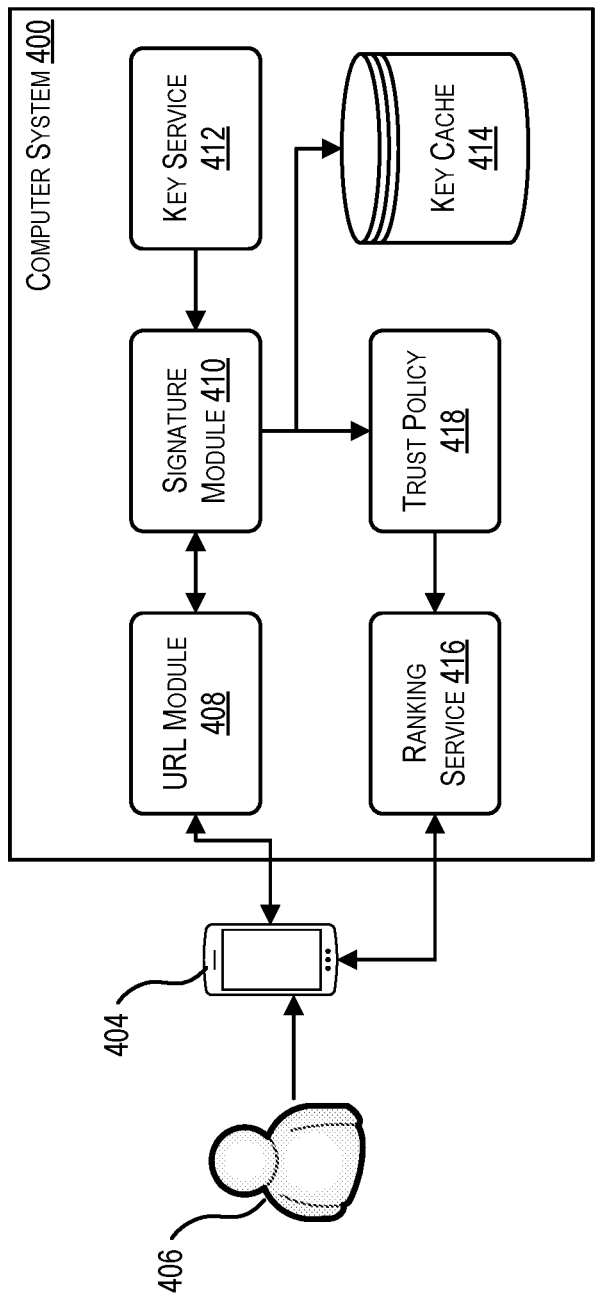
FIG. 4 is a block diagram depicting an example architecture of a computer system for digitally signing URLs and verifying digitally signed URLs received from a user device, according to some embodiments.

FIG. 4 is a block diagram depicting an example architecture of a computer system 400 for digitally signing URLs and verifying digitally signed URLs received from a user device 404, according to some embodiments. The computer system may be an example of the server device 102 of FIG. 1, while user device 404 may be an example of user device 106 of FIG. 1. Although the communications channels between the systems and modules of FIG. 2 are illustrated with arrows indicating generally a flow of data or information, the arrows are not intended to connote any single process or operation.

As illustrated, the computer system 400 can include URL module 408, signature module 410, key service 412, a key cache 414, a ranking service 416, and a trust policy 418. The computer system may be configured to receive requests, including HTTP requests, from user device 404 based on user input from user 406. The computer system 400 can generate network pages (e.g., web pages) in response to the requests and send the network pages to the user device 404 for display at an interface of the user device 404.

URL module 408 may be configured to generate one or more URLs for a network page. As part of generating the network page, the URL module 408 may generate URLs for each interactive element (e.g., link) in the network page. In some embodiments, some, any, or all of the URLs may be signed URLs. In those embodiments where some URLs are signed and some are not, the signed URLs may be URLs generated that include a refinement parameter. For example, for a network page with search results, the URLs for refinements to the search results may be signed URLs, while other URLs in the network page (e.g., navigational links) may be unsigned.

To generate the signed URLs, the URL module can call the signature module 410 and provide the URL to be signed as well as one or more identifiers related to the URL. The identifiers may be a session identifier, a market identifier, a query identifier, or other identifier. The identifier may correspond to the generated URL, a request (e.g., a search request prompting the generation of the URL and/or signed URL), a user account, a user device, or the like.

A session identifier may be a value that uniquely identifies a session of the user device 404 interacting with the computer system 400. The session identifier may be generated by the computer system 400 and provided to the user device 404 as an HTTP cookie for storage at the user device 404. The computer system 400 may be configured to prevent the session identifier from being tampered with. The computer system 400 may obtain the session identifier from the user device as part of an earlier request (e.g., the search request) or interaction from the user device 404 as part of the session. In some examples, the session identifier may be associated with a user or user account interacting with the computer system 400.

A market identifier may be a value that identifies a part of the service provider's website. For example, the service provider may be an online retailer with different stores offering different selections of items to the user 406. The user 406 may have a single user account with the retailer, so that a session identifier may not be unique across different stores. The market identifier may identify to which store the requests are directed. The computer system 400 may store market identifiers that may be obtained by URL module 408 when generating URLs.

A query identifier may be a value uniquely identifying the URL generated by URL module 408 when compared to all other URLs generated by URL module 408. In some embodiments, the query identifier may be a timestamp for when the URL was generated. The timestamp can be used by the computer system when obtaining keys and to determine the age of a URL or corresponding request. The query identifier may be part of the URL.

The signature module 410 may be configured to use a cryptographic hashing algorithm (e.g., HMAC-SHA256) to generate a cryptographic hash from the URL and the one or more identifiers. To generate the hash, the signature module 410 can call key service 412. Key service 412 can be a secrets service of the computer system 400, configured to manage secrets (e.g., keys, credentials, etc.). The key service 412 can generate keys in response to a call from signature module 410. The key service 412 may also be configured to rotate keys according to a schedule. For example, the key used to sign URLs may be valid for a single day, with a new key generated each day. Calls made to key service 412 on different days may return different keys. The key service 412 may store keys as encrypted secrets to preserve the security of the keys. Once the signature module obtains the key, it can compute the cryptographic hash value and provide the hash value to the URL module 408 as the digital signature. The URL module may then add the digital signature to the URL to generate the signed URL.

In some embodiments, the key generated by key service 412 is a private key that is not shared with other devices outside of computer system 400. In other embodiments, key service 412 may generate a public/private key pair, where the public key is provided to the signature module for signing URLs and the private key is retrieved and used to verify signed URLs obtained from subsequent requests.

The signature module 410 can store the key obtained from key service 412 in key cache 414. The cached keys may be associated with a time range for the validity of the key. For example, for keys that rotate every day, the key used to sign URLs on a particular day may be cached with an association to the particular day. If the signature module 410 needs to retrieve a key to verify a signed URL, the signature module 410 can obtain the correct key from the cache for the time range corresponding to when the URL was signed. The query identifier for the signed URL may be a timestamp and can be used to look up the correct key in the cache. In some embodiments, separate caches may be implemented in the computer system 400 for each valid time range, to improve the speed of cache retrieval of keys.

The signature module 410 can also be configured to verify signed URLs. The computer system 400 may receive a request from user device 404 containing a signed URL. The signature module 410 can obtain the stored key from the key cache 414 using the identifier (e.g., query identifier). The signature module 410 can then use the retrieved key, the URL, and the one or more identifiers to compute a second cryptographic hash value and compare the second cryptographic hash value and the digital signature. If the values match, the signed URL is verified, indicating that the signed URL has not been altered and was sent to the computer system with the correct identifier(s).

In some embodiments, the digital signature generated by the signature module 410 may not be included with the signed URL. The signature module 410 may instead store the digital signature in a cache (e.g., a cache separate from key cache 414), including an association with the digital signature and the URL used to generate the digital signature. The computer system 400 may then send the URL to the user device 404 as part of the network page. When the computer system 400 receives a request from user device 404 that contains the URL, the computer system 400 can use a session identifier and a query identifier (e.g., a timestamp) of the request to retrieve the stored digital signature associated with the URL sent with the network page. The computer system 400 can then verify the digital signature as described above, using the received URL to generate a second cryptographic hash value and comparing the second cryptographic hash value and the digital signature.

The ranking service 416 may be configured to provide a ranking of items provided by the service provider. The computer system 400 can use the ranking to arrange the items within the network pages generated by the computer system 400 and displayed at the user device 404. The ranking service 416 may use a ranking model to produce the ranking. The ranking model may be a statistical model, a machine learning model, a predictive model, or other similar model that can produce a ranking based on input data. The input data can include interaction information for users of the service provider's website, including user 406. The interaction information can include information for how a user navigates through the service provider's website, what search terms are used, which search refinements were selected, the order of refinements, which items were viewed (e.g., via a detail page for the item), whether an item was selected by the user (e.g., a product purchased, a search result viewed/read, etc.), and the like.

When a request with a signed URL is verified, the computer system 400 can log that verification with trust policy 418. The trust policy 418 may be configured to store indications for which requests were verified trusted (correct digital signature) and which requests were verified untrusted (incorrect digital signature). The verified trusted requests may be flagged as trusted in the trust policy 418, while the verified untrusted requests may be flagged as potentially tampered. The ranking service 416 may take the logged trust policy 418 information as a further input to the ranking module and use it to exclude potentially tampered results from the ranking determination.

In some embodiments, the ranking service 416 may use the logged trust policy 418 to modify the ranking model to account for the potentially tampered requests. For example, a second user on a second user device may receive a link to a refined search web page at retailer's website from an innocuous source, including a shared link from an the first user device 404. If the user follows the link to access the web page, the request will be logged as potentially tampered, since the digital signature of the signed URL for the link will not match the cryptographic hash generated from the URL and the identifier from the second user device. However, the second user may subsequently view or purchase the item or have other interactions with the website that may alter the ranking produced by the ranking service 416. Because the interaction information for the second user may be valid, the ranking service 416 may still use the potentially tampered request from the second user as an input into the ranking model, but with a weight accounting for the likelihood that the request was "organic" based on the second users subsequent interactions.

In addition to the ranking service 416, the computer system 400 may provide the information for the trust policy 418 to other downstream services and systems. For example, logged untrusted request information may be used by a network security service to evaluate whether the requests are from a malicious source (e.g., systems attempting to inject malicious code or webpages into a website). The network security service may prevent the computer system 400 from parsing or serving future requests from sources of logged untrusted requests according to a security policy. The network security service could also evaluate whether the requests are from automated systems (e.g., robots) and prevent the computer system 400 from serving the requests, thereby improving network security and efficient use of computational resources.

As another example, the computer system 400 may provide the information for the trust policy 418 to an analytics service that may be configured to evaluate request traffic for how users interact with the website. For example, the analytics service may use trusted requests to characterize "organic" interactions with the computer system, which can be used to further refine models (e.g., a ranking model) used by the computer system 400 respond to the request. As another example, some requests may be flagged as tampered due to innocuous modifications of the URL. A user may modify a URL to return a specific page (e.g., page 3) of the search results, for instance, if the results that typically appear on that page are more valuable for the search. If multiple modifications of this type are made, the analytics service could use the untrusted requests to build hypotheses for potential causes of the modifications (e.g., difficult to navigate to later pages in search results, etc.). As another example, the analytics service may identify the age of trusted requests (e.g., from the query identifier) to determine older URLs (e.g., from old search results network pages) that are still being used in requests (e.g., bookmarked URLs).

Figure 5:
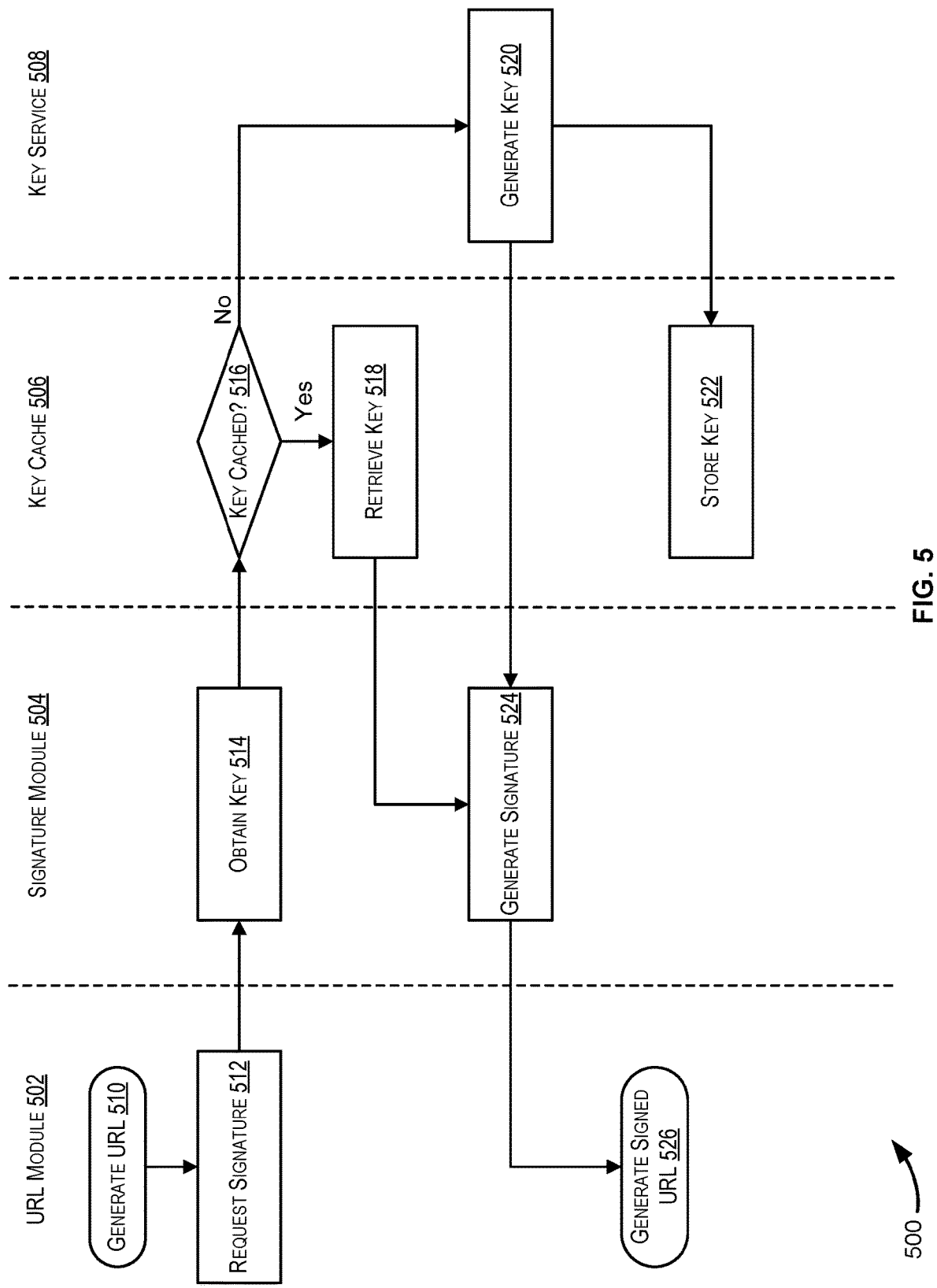
FIG. 5 is a swim lane flow chart illustrating an example method for digitally signing a URL, according to an embodiment.

FIG. 5 is a swim lane flow chart illustrating an example process 500 for digitally signing a URL, according to an embodiment. The process 500 may be performed by one or more components of a computer system of a service provider (e.g., computer system 400 of FIG. 40, including URL module 502, signature module 504, key cache 506, and key service 508. These components may be similarly named components described above with respect to FIG. 4. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 500 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 500 may begin at start point 510, with the URL module 502 generating a URL. The URL may be generated in response to a request received from a user device to navigate to a network page of the service provider. The URL may be included in the network page (e.g., as part of a link).

At block 512, the URL module 502 can request a digital signature by calling signature module 504. To generate the digital signature, signature module 504 can obtain a key, at block 514. The key may be a key usable with a hashing function to generate hash values. For example, the key may be an arbitrary 256 bit value for use with a HMAC-SHA256 hashing algorithm. The key may be provided by a key service 508. The key may also be stored in a key cache 506. For example, the signature module 504 may have previously obtained the key to sign another URL and stored the key in the key cache 506. At decision 516, the key cache can be checked for the key. Since keys provided by the key service 508 may be rotated according to a schedule, the cached keys may be identified according to a time range for validity based on the schedule. To determine the time range, the signature module 504 can use a query identifier that can specify a timestamp for the URL to lookup the correct key in the cache. If the key is found in the key cache 506, the key can be retrieved, at block 518. If the key is not in the key cache 506, the signature module 504 can call key service 508 to generate the key, at block 520.

At block 524, the signature module 504 can generate the digital signature using they key. Generating the digital signature can include inputting the key, the URL, and one or more identifiers into a cryptographic hashing function to produce cryptographic hash value. The has value may be the digital signature. The signature module 504 may return the digital signature to the URL module 502, which can add the digital signature to the URL to generate a signed URL. The digital signature may be included as a parameter of a field in the URL.

Figure 6:
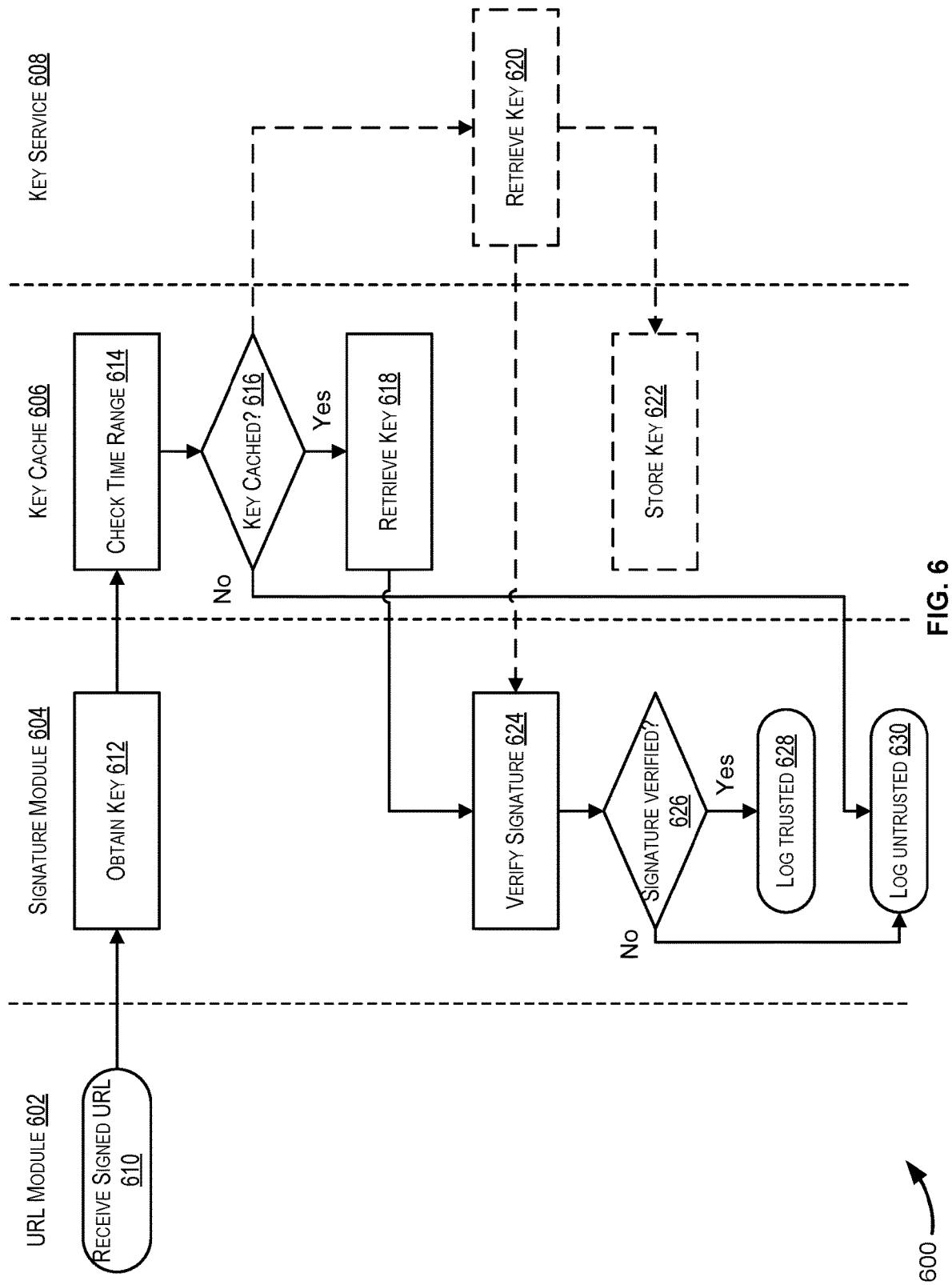
FIG. 6 is another swim lane flow chart illustrating an example method for verifying the digital signature of a received URL, according to an embodiment.

FIG. 6 is another swim lane flow chart illustrating an example process 600 for verifying the digital signature of a received URL, according to an embodiment. As with process 500 of FIG. 5, process 600 may be performed by one or more components of a computer system (e.g., computer system 400 of FIG. 4).

The process 500 can begin at start point 610 with a URL module 602 receiving a signed URL. The signed URL may be part of a request sent from a user device to navigate to an additional network page of a website based on some user interaction (e.g., selecting a search refinement link) at the user device. The request may be an HTTP request, which can include the signed URL. The URL module 602 can also receive an identifier from the user device (e.g., a session identifier) in addition to the request or part of the request. The signed URL can include one or more parameters as fields within the URL, with a digital signature appended to the URL.

The URL module 602 can call signature module 604 to verify the digital signature on the signed URL. To verify the digital signature, the signature module 604 can obtain a key, at block 612. The key may be stored in a key cache 606 of the computer system. At block 614, a time range associated with the signed URL may be checked to obtain the correct key. As described above with respect to FIG. 4, keys used by the signature module may be rotated according to a schedule and cached with an association with the time range. The computer system can use a query identifier (e.g., a timestamp for the signed URL) to check the time range to select the correct key from the key cache 606. At decision 616, the cache is checked for the presence of the key associated with the time range. If the key is present, the signature module retrieves the key at block 618. If the key is not present, for instance because no key is present in the cache for the time range checked in block 614, then the request may be logged as untrusted, at endpoint 630. The inability to locate a corresponding key in the key cache 606 may indicate that the query identifier or other portion of the signed URL was modified or tampered with.

In some embodiments, if the key is not present in the key cache 606, the key service 608 may be called to retrieve the key from a cache or other storage associated with the key service 608, at block 620. If the key is obtained from key service 608, it may be stored in the key cache 606, at block 622.

At block 624, the signature module can verify the digital signature of the signed URL. The signature module can input a portion of the signed URL (e.g., the URL fields except the digital signature), the key, and one or more identifiers (e.g., session identifier, query identifier, market identifier) into a cryptographic hash function to produce a cryptographic hash. At decision 626, if the cryptographic hash matches the digital signature, then the signature is verified, and the request corresponding to the signed URL can be logged as trusted (e.g., with a trust policy 418 of FIG.

4), at endpoint 628. If the cryptographic hash does not match the digital signature, the signature is not verified, and the request corresponding to the signed URL can be logged as untrusted, at endpoint 630.

Figure 7:
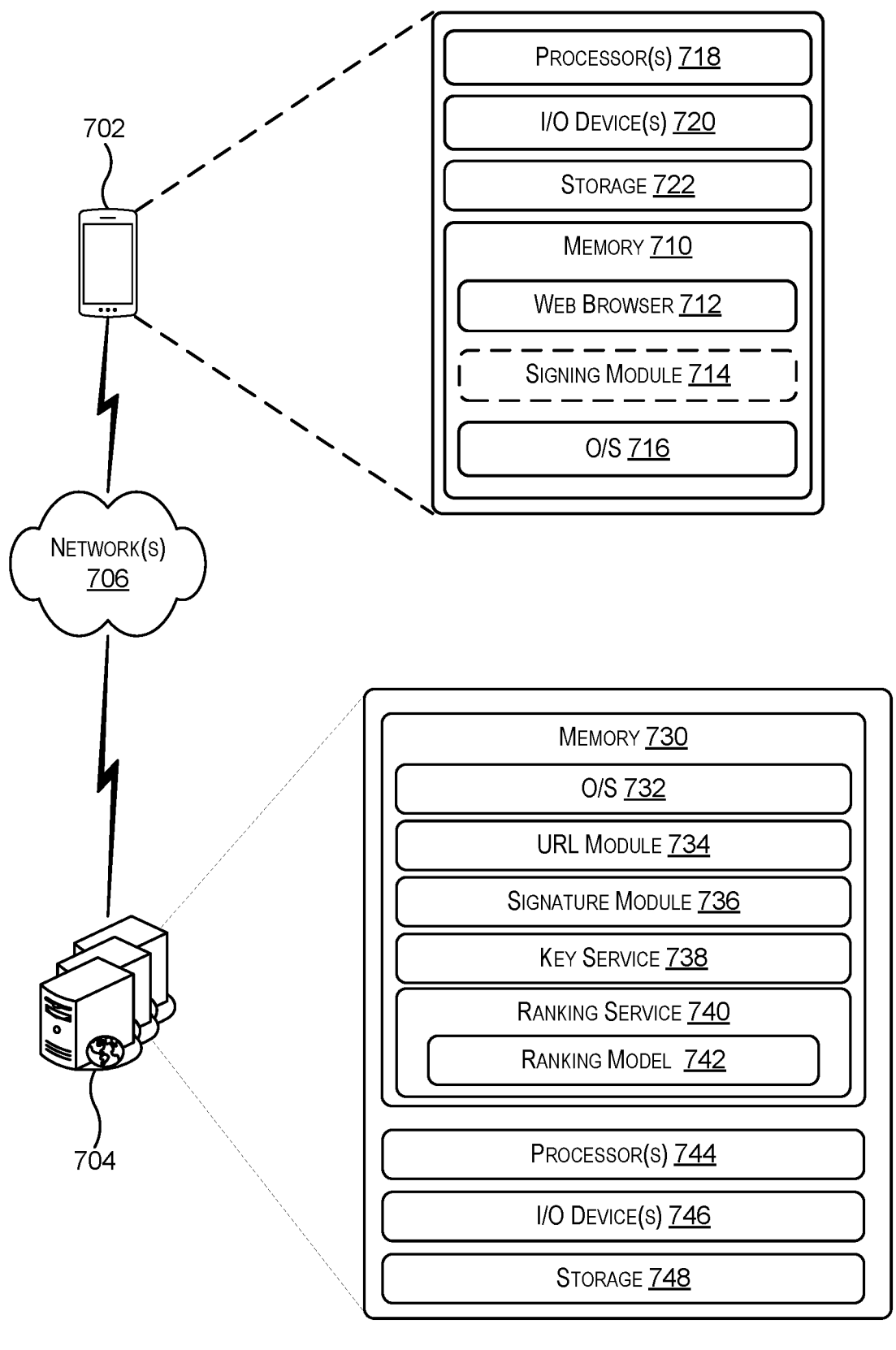
FIG. 7 is a block diagram depicting an example architecture of a computer system, including a plurality of modules that may perform functions in accordance with at least one embodiment.

FIG. 7 is a block diagram depicting an example architecture of a system 700, including a plurality of modules that may perform functions in accordance with at least one embodiment. The system includes a user device 702 (e.g., a mobile device, a smart phone, or other suitable computing device), a computer system 704, and one or more network(s) 706. The computer system 704 can be a server device or one or more remote computing devices, including cloud device, and may host URL module 734, signature module 736, key service 738, and ranking service 740, which may in turn be an example of other similarly named components described herein, including URL module 408, signature module 410, key service 412, and ranking service 416 of FIG. 4, respectively. The network(s) may include any one or a combination of many different types of networks, such as cable networks, the Internet, wireless networks, cellular networks, and other private and/or public networks.

As described herein, the user device 702 can have at least one memory 710, one or more processing units (or processor (s)) 718, and one or more input/output ("I/O") device(s) 720. The processor(s) 718 may be implemented as appropriate in hardware, computer-executable instructions, firmware or combinations thereof. Computer-executable instruction or firmware implementations of the processor(s) 718 may include computer-executable or machine executable instructions written in any suitable programming language to perform the various functions described. The I/O device(s) 7120 can include displays, monitors, touch screens, mouse, keyboard, or other I/O device.

The memory 710 may store program instructions that are loadable and executable on the processor(s) 718, as well as data generated during the execution of these programs, including URLs, signed URLs, requests (e.g., HTTP request information), identifiers (e.g., session identifiers), and the like. Depending on the configuration and type of user device 702, the memory 710 may be volatile (such as random access memory ("RAM")) or non-volatile (such as read-only memory ("ROM"), flash memory, etc.). In some implementations, the memory 710 may include multiple different types of memory, such as static random access memory ("SRAM"), dynamic random access memory ("DRAM") or ROM. The user device 702 may also include additional storage 722, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 722 may be utilized to store data contents received from one or more other devices (e.g., computer system 704). For example, the storage 722 may store session identifiers generated by the computer system 704 and sent to the user device 702 to identify an interactive session with the service provider.

The memory 710 may include an operating system (O/S) 716 and one or more application programs, modules, or services for implementing the features disclosed herein, including a web browser 712. The web browser 712 may be configured to interface with one or more components of a service provider's computer system (e.g., computer system 704) to send requests for network pages for a website of the service provider. The web browser 712 may, in some embodiments, be an application associated with the service provider (e.g., a store application for an online retailer) configured to receive network pages from the computer system 704. The network pages may be presented at one of the I/O device(s) 714 (e.g., a display). The web browser 712 may receive user input and generate requests (e.g., HTTP requests) for interactions with content of the network page.

Turning now to computing system 704 in more detail, the computing system 704 can be any suitable type of computing system including, but not limited to, a laptop computer, a desktop computer, a mobile phone, a smartphone, a server computer, etc. In some embodiments, the computing system 704 is executed by one or more virtual machines implemented within a cloud computing or other hosted environment. The cloud computing environment may include provisioned computing resources like computing, storage, and networking. The computing system 704 can communicate with the user device 702 via the network(s) 706 or other network connections. The computing system 704 may be configured to implement the functionality described herein as part of a distributed computing environment.

The computing system 704 can include a memory 730, one or more processor(s) 744, I/O devices 746, and at least one storage unit 748. As with the processor(s) 718 of user device 702, the processor(s) 744 may be implemented as appropriate in hardware, computer-executable instructions, software, firmware, or combinations thereof. Computer-executable instruction, software, or firmware implementations of the processor(s) 744 may include computer-executable or machine-executable instructions written in any suitable programming language to perform the various functions described. The memory 730 may store program instructions that are loadable and executable on the processor(s) 744, as well as data generated during the execution of these programs. Depending on the configuration and type of memory included in the computing system 704, the memory 730 may be volatile (such as RAM) and/or non-volatile (such as read-only memory ("ROM"), flash memory, or other memory). In some embodiments, the storage 748 may include one or more databases, data structures, data stores, or the like for storing and/or retaining information associated with the computing system 704 or the user device 702. The storage 748 may include caches for storing cryptographic keys (e.g., key cache 414 of FIG. 4).

The memory 730 may include an operating system (O/S) 732 and one or more application programs, modules, or services for implementing the features disclosed herein, including URL module 734, signature module 736, key service 738, and ranking service 740. The URL module 734 may be configured to generate one or more URLs for a network page to be sent to user device 702 for presentation at a display of the user device 702. Some, any, or all of the URLs generated by URL module 734 may be signed URLs. To generate a signed URL, the URL module may call the signature module 736 to obtain a digital signature. Signature module 736 may be configured to use a cryptographic hashing function (e.g., HMAC-SHA256) to generate a cryptographic hash using a URL, one or more identifiers, and a key. The key may be generated by the key service 738.

In some embodiments, the ranking service 740 may be configured to provide a ranking usable by the computer system 704 for arranging search results on the network page sent to the user device. The ranking may be generated from a ranking model 742 (e.g., a predictive model, machine learning model, or other statistical model) that uses user interaction information as inputs. The ranking can correspond to an evaluation metric for how pertinent a particular search result may be for the user requesting the search and corresponding network page. The interaction information can include information for the requests received from the user device, including requests having signed URLs for refining the search results. Based on a verification of the digital signature of the signed URLs, the requests can be logged as either trusted or untrusted based on whether the URL has been modified or has been received from a different user device with different identifiers. Untrusted requests and corresponding interaction information may be omitted from the ranking model when determining the ranking or updating the ranking.

Figure 8:
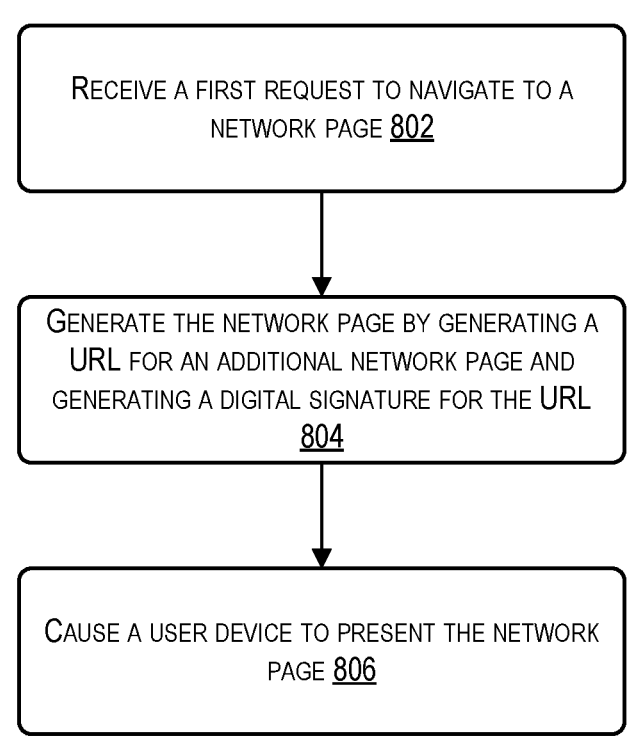
FIG. 8 is a simplified flow diagram of an example process for receiving a request, generating a network page that includes a URL link, and digitally signing the URL, according to an embodiment.

FIG. 8 is a simplified flow diagram of an example process 800 for receiving a request, generating a network page that includes a URL link, and digitally signing the URL, according to an embodiment. The process 800 may be performed by a computer system described herein, including computer system 400 of FIG. 4 and computer system 704 of FIG. 7. Some of the operations described with respect to process 800 may be similar to operations described with respect to process 500 of FIG. 5 and process 600 of FIG. 6.

The process 800 can begin at block 802 when a computer system of a service provider receives a first request to navigate to a network page. The first request may be a search request. The network page can then be a network page showing search results for the search. For example, the network page could be a web page of a website for an online retailer, and the search could be a search for items offered by the retailer.

At block 804, the computer system can generate the requested network page based in part on the request. Generating the network page can include generating a URL for a link to be presented on the page and then digitally signing the URL to generate a signed URL. Generating the URL may be performed by a URL module of the computer system, for example, URL module 408 of FIG. 4. The URL can be used to locate resources associated with a refinement of the search results in an additional network page. Generating a digital signature may be performed by a signature module of the computer system, for example signature module 410 of FIG. 4. Generating the digital signature can include obtaining a cryptographic key from a key service and inputting the key, the URL, and one or more identifiers into a cryptographic hashing algorithm to produce a cryptographic hash. The cryptographic hash may be included in the URL as a digital signature to produce a signed URL. For example, the cryptographic hash may be appended to the URL as a parameter field. In some embodiments, the identifier may be a session identifier associated with the user device and received from the user device in addition to the request. In some embodiments, the identifier is a market identifier specifying a part of the service provider's website to which the requested network page belongs. The market identifier may be stored by the computer system. In some embodiments, the identifier may be a query identifier that includes a timestamp corresponding to a time when the URL is generated. The query identifier may be included in the URL. The query identifier may be usable to obtain the cryptographic key that is valid for a time range containing the timestamp.

At block 806, the computer system can cause the user device to present the network page. The network page may be sent to the user device for display in a web browser or similar application on the user device. The network page can include a link or similar interactive feature corresponding to the signed URL. For example, the link may be a link to the refined search results of results shown on the network page.

In some embodiments, the computer system can receive a second request to navigate to the additional network page. The second request can include the signed URL. For example, the second request may be sent in response to a user selecting the link in the network page. The computer system may verify the signed URL by obtaining the cryptographic key from a cache and generating a current cryptographic hash using the URL, the identifier, and the cryptographic key. If the signed URL is verified (e.g., the digital signature matches the current cryptographic hash), the computer system can store an indication that the second request is an untampered request. The untampered request may be used to generate an updated ranking for an additional subset of items to be displayed on network pages.

Figure 9:
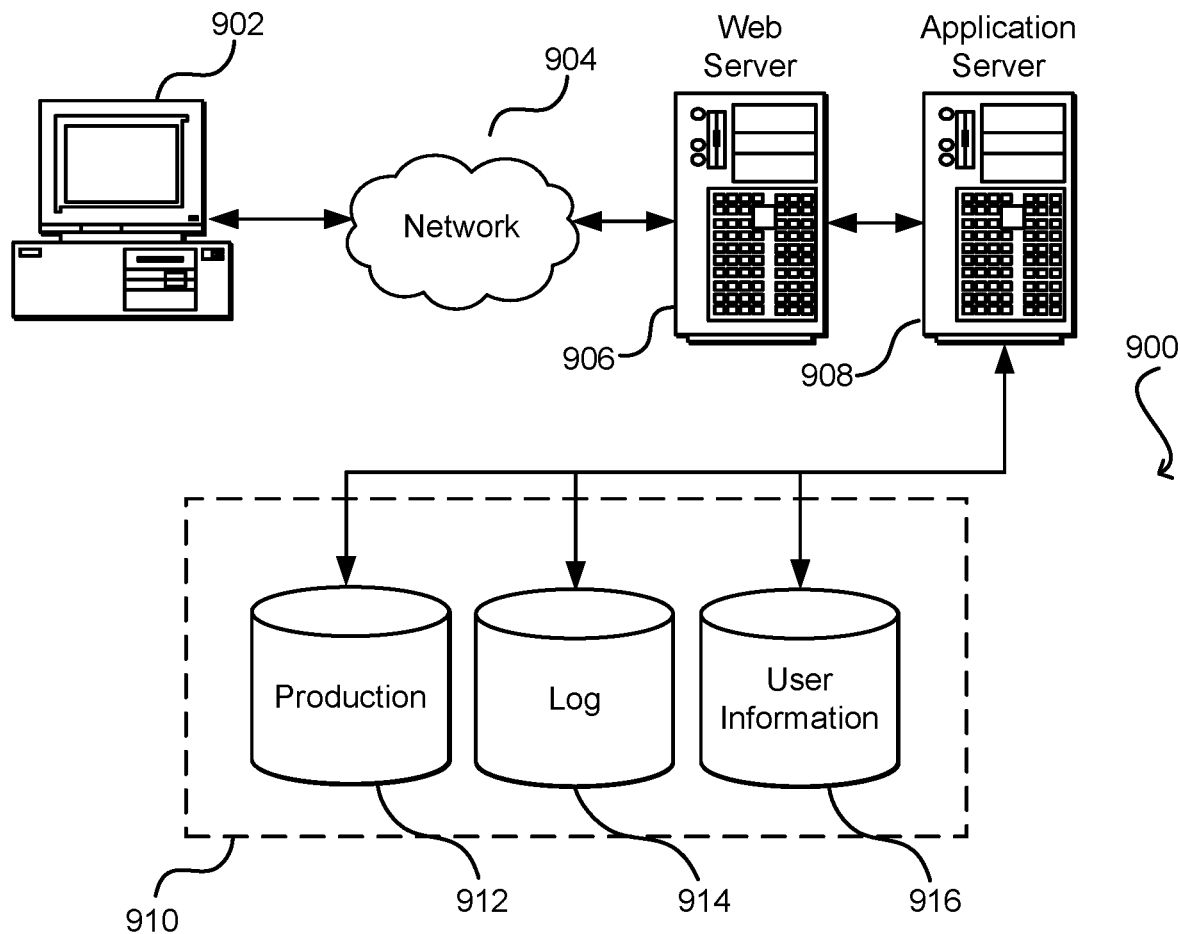
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Certain embodiments of the present disclosure may involve storing and using interaction data associated with a person or device (e.g., user data or device data). Storage and/or use of such interaction data may be controlled by a user using privacy controls associated with a device and/or a companion application associated with a device. Accordingly, users may opt out of storage of interaction data and/or may select particular types of interaction data that may be stored while preventing aggregation and storage of other types of interaction data. Additionally, aggregation, storage, and use of interaction data, as described herein, may be compliant with privacy controls, even if not technically subject to them, to bolster user trust. For example, interaction and other data described herein may be treated as if it fell under acts and regulations, such as the Health Insurance Portability and Accountability Act (HIPAA) and the General Data Protection Regulation (GDPR), even if it does not actually fall under these acts and regulations.

What is claimed is:

1. A computer system of a service provider, comprising:
one or more processors; and
one or more memories storing computer-executable instructions that, when executed with the one or more processors, cause the computer system to at least:
receive, from a user device, a search request for information about items, the search request associated with a session identifier of a user account of the service provider;
responsive to the search request, generate a network page by:
generating a uniform resource locator (URL) for an additional network page, the additional network page corresponding to a refinement of the search request;

generating, using the URL and the session identifier, a digital signature for the URL;

combining the URL and the digital signature to produce a signed URL;

and including the signed URL in the network page;

cause the user device to present the network page;

receive, from the user device, a request to navigate to the additional network page, the request comprising the signed URL;

verify the signed URL based at least in part on information from the signed URL and the digital signature;

in accordance with the signed URL being verified, cause the user device to present the additional network page, the refinement of the search request comprising a subset of the items arranged according to a ranking, the ranking generated by a ranking model having inputs comprising trust policy information characterized by at least an additional verified signed URL;

receive, from the user device, a further indication that an item of the subset of the items was selected; and generate, using the ranking model, an updated ranking, the ranking model taking as inputs the further indication, the search request, and the request, the updated ranking corresponding to an additional subset of the items.

2. The computer system of claim 1, wherein the URL comprises a query identifier corresponding to a time range, and wherein generating the digital signature for the URL comprises:

obtaining, using the query identifier, a cryptographic key associated with the time range;

generating a cryptographic hash using the URL, the session identifier, and the cryptographic key; and storing the cryptographic key in a cache.

3. The computer system of claim 2, wherein verifying the signed URL comprises:

obtaining, using the query identifier, the cryptographic key from the cache;

generating a current digital signature by generating a current cryptographic hash using the URL, the session identifier, and the cryptographic key; and comparing the current digital signature with the digital signature in the signed URL.

4. The computer system of claim 1, wherein the one or more memories store additional instructions that, when executed by the one or more processors, cause the computer system to further:

in accordance with the signed URL being verified, store an indication that the request is an untampered request;

receive, from a second user device, a second request to navigate to the additional network page having the refinement of the items; and responsive to the second request, cause the second user device to display the additional network page, the refinement of the search request comprising the additional subset of the items arranged according to the updated ranking.

5. A method implemented by a computer system of a service provider, the method comprising:

receiving, from a user device, a first request for information about items, the first request associated with an identifier;

based at least in part on the first request, generating a network page, the network page comprising a set of the items arranged according to a first ranking, the first ranking generated by a ranking model having inputs comprising trust policy information characterized by at least an additional verified signed uniform resource locator (URL), and the network page generated by:

generating a URL for an additional network page linked from the network page; and generating, using the URL and the identifier, a signed URL comprising a digital signature; and causing the user device to present the network page comprising the signed URL;

receiving, from the user device, a second request to navigate to the additional network page, the second request comprising the signed URL;

verifying the signed URL based at least in part on information from the signed URL and the digital signature; and generating, using the ranking model, an updated ranking, the ranking model taking as inputs the second request, an indication that the second request is an untampered request, and a further indication with the additional network page, the updated ranking corresponding to an additional subset of the items, and the updated ranking usable to generate a refinement of the items on the additional network page.

6. The method of claim 5, further comprising:

in accordance with the signed URL being verified, causing the user device to present the additional network page, the additional network page displaying a refined set of the items arranged according to a second ranking generated by the ranking model.

7. The method of claim 6, wherein the URL comprises a query identifier corresponding to a time range, and wherein generating the digital signature for the URL comprises:

obtaining, using the query identifier, a cryptographic key associated with the time range;

generating a cryptographic hash using the URL, the identifier, and the cryptographic key; and storing the cryptographic key in a cache.

8. The method of claim 7, wherein verifying the signed URL comprises:

obtaining, using the query identifier, the cryptographic key from the cache;

generating a current cryptographic hash using the URL, the identifier, and the cryptographic key; and comparing the current cryptographic hash with the digital signature in the signed URL.

9. The method of claim 6, further comprising:

in accordance with the signed URL being verified, storing the indication that the second request is an untampered request.

10. The method of claim 5, further comprising:

receiving, from a second user device, a third request to navigate to the additional network page having the refinement of the items; and responsive to the third request, causing the second user device to display the additional network page, the refinement of the items comprising the additional subset of the items arranged according to the updated ranking.

11. The method of claim 5, further comprising:

receiving, from the user device, a request to navigate to the additional network page, the request comprising a modified URL;

verifying the modified URL based at least in part on information from the modified URL and the digital signature;

in accordance with the modified URL failing the verification, storing an indication that the request is a tampered request; and causing the user device to present the additional network page, the additional network page displaying a refined set of the items arranged according to a ranking, the ranking determined based at least in part on the indication that the request is the tampered request.

12. The method of claim 5, further comprising:
receiving, from a second user device, a request to navigate to the additional network page, the request comprising the signed URL;
verifying the signed URL based at least in part on information from the signed URL and the digital signature;
in accordance with the signed URL failing the verification, storing an indication that the request is an invalid request; and
causing the user device to present the additional network page, the additional network page displaying a refined set of the items arranged according to a ranking, the ranking determined based at least in part on the indication that the request is a tampered request.

13. The method of claim 5, wherein the identifier is a session identifier associated with an interactive session of the user device with the service provider, and further comprising receiving, from the user device with the first request, the identifier.

14. The method of claim 5, wherein the identifier is a market identifier associated with an interactive session of the user device with the service provider.

15. A non-transitory computer-readable storage medium storing instructions that, when executed by a user device, cause the user device to perform operations comprising:
sending, to a computer system of a service provider, a search request for information about items, the search request associated with an identifier of the user device;
receiving, from the computer system, a network page, the network page comprising a signed uniform resource locator (URL) for an additional network page, the signed URL comprising a digital signature generated based at least in part on the identifier and a URL of the additional network page, and the additional network page corresponding to a refinement of the search request, the refinement comprising a refined set of the items arranged according to a ranking, the ranking generated by a ranking model having inputs comprising (i) trust policy information characterized by at least an additional verified signed URL received from an additional user device interacting with other network pages of the computer system and (ii) interaction information of the additional user device with the other network pages;
presenting, at a display of the user device, the network page.

16. The non-transitory computer-readable storage medium of claim 15, storing additional instructions that, when executed by the user device, cause the user device to perform further operations comprising:
sending, to the computer system of the service provider, a request to navigate to the additional network page, the request comprising the signed URL;
in accordance with the signed URL being verified by the computer system, receiving, from the computer system, the additional network page; and
presenting, at the display of the user device, the additional network page, the additional network page displaying the refined set of the items.

17. The non-transitory computer-readable storage medium of claim 15, storing additional instructions that, when executed by the user device, cause the user device to perform further operations comprising:
modifying, by the user device, the signed URL to produce a modified URL;
sending, to the computer system, a request to navigate to the additional network page, the request comprising the modified URL;
in accordance with a determination that the signed URL has not been verified, receiving, from the computer system, the additional network page comprising the refined set of the items arranged according to the ranking, the ranking determined based at least in part on an indication that the request is a tampered request; and
presenting, at the display of the user device the additional network page displaying the refined set of the items.

18. The non-transitory computer-readable storage medium of claim 15, storing additional instructions that, when executed by the user device, cause the user device to perform further operations comprising:
receiving, from a second user device, a second signed URL for a second network page;
sending, to the computer system, a request to navigate to the second network page, the request comprising the second signed URL;
in accordance with a determination that the second signed URL has not been verified, receiving, from the computer system, the second network page comprising an additional refined set of the items according to an additional ranking, the additional ranking determined based at least in part on an indication that the request is a tampered request; and
presenting, at the display of the user device the second network page displaying the additional refined set of the items.

19. The non-transitory computer-readable storage medium of claim 15, wherein the identifier is a session identifier associated with an interactive session of the user device with the service provider, and further comprising sending the identifier to the computer system of the service provider.

20. The non-transitory computer-readable storage medium of claim 15, wherein the identifier is a market identifier associated with an interactive session of the user device with the service provider.

* * * * *